（12） United States Patent
Bharathan et al.

(10) Patent No.: US 10,762,084 B2
(45) Date of Patent: Sep. 1, 2020

(54) DISTRIBUTE EXECUTION OF USER-DEFINED FUNCTION

(71) Applicant: ENTIT Software LLC, Sunnyvale, CA (US)

(72) Inventors: Vivek Bharathan, Cambridge, MA (US); Charles Edward Bear, Cambridge, MA (US); Nga Tran, Cambridge, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 299 days.

(21) Appl. No.: 15/751,265

(22) PCT Filed: Aug. 11, 2015

(86) PCT No.: PCT/US2015/044612
§ 371 (c)(1),
(2) Date: Feb. 8, 2018

(87) PCT Pub. No.: WO2017/027015
PCT Pub. Date: Feb. 16, 2017

(65) Prior Publication Data
US 2018/0232416 A1    Aug. 16, 2018

(51) Int. Cl.
| G06F 16/00 | (2019.01) |
| G06F 16/2453 | (2019.01) |
| G06F 16/25 | (2019.01) |
| G06F 16/22 | (2019.01) |
| G06F 16/23 | (2019.01) |
| G06F 16/2455 | (2019.01) |

(52) U.S. Cl.
CPC .... *G06F 16/24537* (2019.01); *G06F 16/2282* (2019.01); *G06F 16/2379* (2019.01); *G06F 16/24542* (2019.01); *G06F 16/24556* (2019.01); *G06F 16/254* (2019.01); *G06F 16/258* (2019.01)

(58) Field of Classification Search
CPC ............. G06F 16/254; G06F 16/24537; G06F 16/24556; G06F 16/2739; G06F 16/2282
See application file for complete search history.

(56) References Cited

U.S. PATENT DOCUMENTS

| 6,405,212 | B1* | 6/2002 | Samu ...................... G06F 16/21 |
| 8,732,213 | B2 | 5/2014 | Sowell et al. |
| 8,954,418 | B2 | 2/2015 | Faerber et al. |
| 9,971,806 | B2* | 5/2018 | Hu .................... G06F 16/24545 |
| 2004/0117359 | A1 | 6/2004 | Snodgrass et al. |
| 2005/0240577 | A1 | 10/2005 | Larson et al. |

(Continued)

OTHER PUBLICATIONS

Rric Parded, J. Wenny Rahayu, and David Taniar, "Mapping Method and Query for Aggregation and Association i Object-Relational Database Using Collection", Proceedings of the International Conference on Information Technology: Coding and Computing, 2004, pp. 1-5. (Year: 2004).*

(Continued)

*Primary Examiner* — Cheryl Lewis

(57) ABSTRACT

A user-defined function (UDF) is received. Then, execution of the UDF is distributed into a plurality of phases. Lastly, each of the phases is executed separately on a relational database including an aggregate projection that stores an aggregate value calculated from a table column of a table using an aggregate function.

20 Claims, 4 Drawing Sheets

(56) References Cited

U.S. PATENT DOCUMENTS

| | | | |
|---|---|---|---|
| 2010/0100558 A1 | 4/2010 | Bakalash et al. | |
| 2010/0306199 A1* | 12/2010 | Andrea | G06F 16/284 707/740 |
| 2012/0173519 A1 | 7/2012 | Buessow et al. | |
| 2012/0191699 A1 | 7/2012 | George et al. | |
| 2012/0197849 A1* | 8/2012 | Srinivasa | G06F 16/2457 707/687 |
| 2013/0091160 A1* | 4/2013 | Re | G06F 16/2465 707/769 |
| 2013/0254238 A1* | 9/2013 | Yan | G06F 16/90 707/793 |
| 2014/0181141 A1 | 6/2014 | Sowell et al. | |
| 2015/0379077 A1* | 12/2015 | Grosse | G06F 16/24532 707/718 |
| 2016/0335318 A1* | 11/2016 | Gerweck | G06F 16/2282 |

OTHER PUBLICATIONS

Haixun Wang and Carlo Zaniolo, "User Defined Aggregates in Object-Relational Systems", Proceedings of 16th International Conference on Data Engineering, Feb. 29-Mar. 3, 2000, pp. 1-10. (Year: 2000).*

Michael Jaedicke and Bernhard Mitschang, "On Parallel Processing of Aggregate and Scalar Functions in Object-Relational DBMS", 1998 ACM, pp. 379-389. (Year: 1998).*

Sara Cohen, "User-Defined Aggregate Functions: Bridging Theory and Practice", SIGMOD '06 Jun. 27-29, 2006, ACM, pp. 49-60. (Year: 2006).*

Gemmell, J., et al., A Fast Effective Multi-Channeled Tag Recommender, Aug. 18, 2009, Retrieved from the Internet: <http://ceur-ws.org/Vol-497/paper_25.pdf> [retrieved on Jun. 11, 2015, 12 pages.

Hewlett-Packard Development Company, L.P, "HP Vertica Documentation—HP vertica Analytics Platform," Software Version: 7.1 x Dec. 17, 2014 See pp. 22-23, 73, 77, 733-752, 2671, 2883, and 3284.

International Searching Authority, "Notification of transmittal of the International Search Report and the Written Opinion", PCT/US2015/044612, dated May 31, 2016, 15 pages.

Ramezani, M., Improving Graph-based Approaches for Personalized Tag Recommendation, May 2011, Journal of Emerging Technologies in Web Intelligence, vol. 3, No. 2, p. 168-176.

* cited by examiner

DISTRIBUTE EXECUTION OF USER-DEFINED FUNCTION

BACKGROUND

Recent advances in technology have spurred the generation and storage of immense amounts of data. For example, web search engines support searching of huge amounts of data scattered across the Internet. Corporations may generate immense amounts of data through financial logs, e-mail messages, business records, and the like. As technology continues to develop, search and analysis of relevant data among large data sources may become increasingly difficult. Increasing the efficiency of data search technologies may improve user experience.

BRIEF DESCRIPTION OF THE DRAWINGS

The following detailed description references the drawings, wherein.

DETAILED DESCRIPTION

Figure 1:
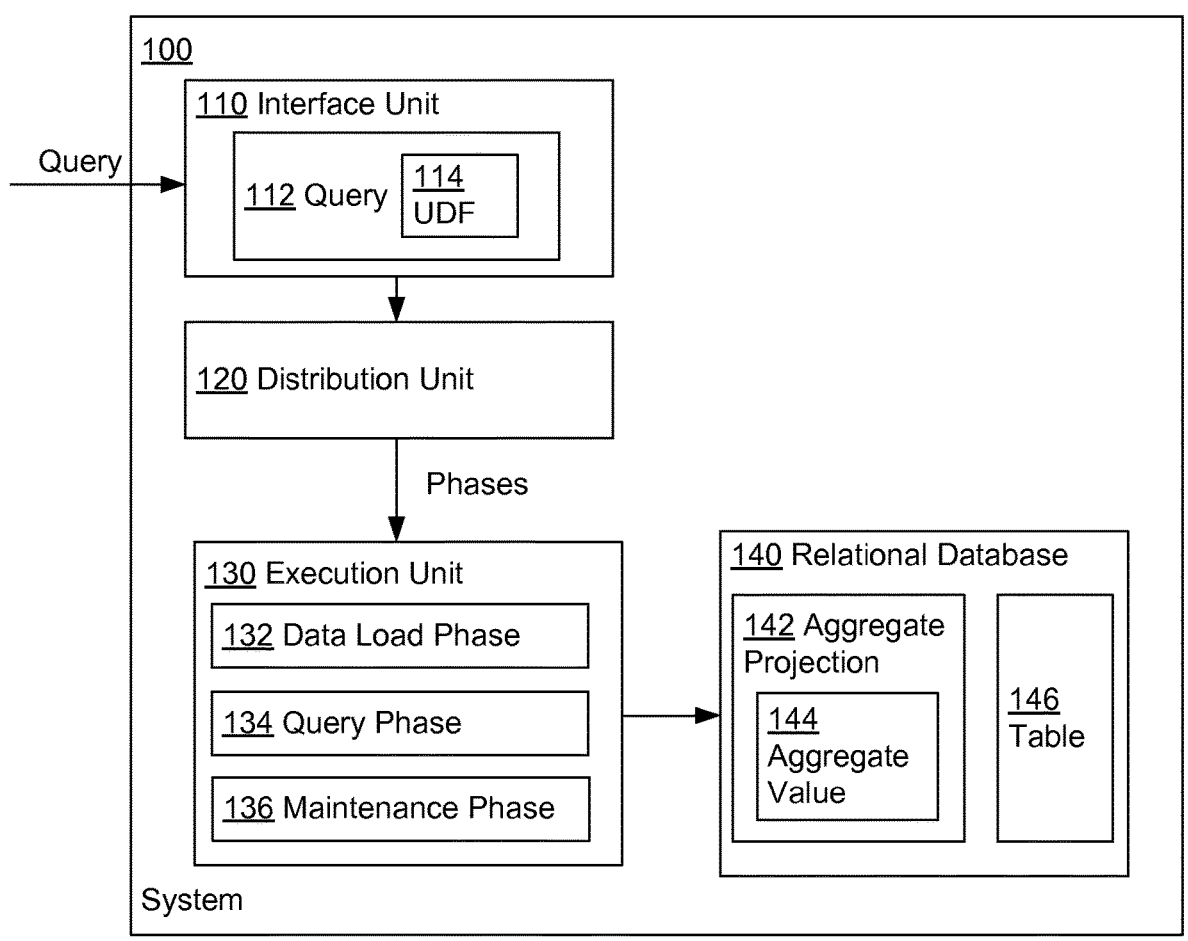
FIG. 1 is an example block diagram of a system to distribute execution of a user-defined function.

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Large databases are designed to manage vast volumes of data and therefore the speed in which queries may be performed on the database is important. SQL (Standard Query Language) is a programming language that is used for managing data in relational database management systems (RDBMS). User-Defined Functions (UDFs) were introduced in connection with large databases that include libraries of functions that can be defined by a user for operating on a database. UDFs are suited for analytic operations that are relatively difficult to perform in SQL, and that may be performed frequently enough that their performance is a concern.

A projection may refer to a data set of any number of table columns. A projection may take the form of a collection of pre-sorted columns that may contain some or all of the columns of one or more tables. In that regard, a projection may store the data values for one or more table columns, including table columns from a single database table or from multiple databases tables. Thus, a database query may be performed by accessing a projection to retrieve data values stored in the projection or by joining the projection with other projections to collect the data queried by the query.

One particular projection type referenced herein is an aggregate projection (or live aggregate projection). An aggregate projection may refer to a projection that includes columns whose data values have been calculated from columns in a table. Data values for the aggregate projection may be calculated from any number of functions, examples of which include average, sum, minimum, maximum, count, and various other aggregate functions. In some examples, aggregate projections may also include group-by or partition-by expressions to arrange the calculated data values. Thus, an aggregate projection may include aggregated value(s) calculated from a table column using an aggregate function.

Since an aggregate projection includes pre-calculated data, using an aggregate projection to service or execute a query for data may support quicker and more efficient data retrieval. As one illustrative example, an aggregate projection may take the form of:

create projection (a, b, c,) aggp as
select a, b, sum (c) from t group by a, b;

The example aggregate projection above may support quicker data retrieval or access for data queries as compared to non-aggregate projections, because the data stored in the aggregate projection is already pre-sorted or pre-calculated. Thus, the example aggregate projection above may support more efficient data access for the following queries:

select a, b, sum (c) from t group by a, b;
select a, sum(c) from t group by a;
and
select sum (c) from t;

One particular type of an aggregate projection is a top-k projection. A top-k projection may refer to a projection that retrieves or includes the top "k" number of rows from a partition of selected rows. Thus, examples of top-k projections include:

create projection (a, b, c, d, e) topk as
select a, b, c, d, e from t limit 3 over (partition by a,b order by c,d);

The example top-k projection above may support quicker data retrieval or access for data queries as compared to non-aggregate projections, such as for the following queries:

select a, b, c, d, e, from t limit 1 over (partition by a,b, order by c,d)
and
select a, c, e, from t limit 2 over (partition by a order by c);

While some example aggregate projections are provided above, numerous other possibilities exist. For example, aggregate projections may include computations or calculations (e.g., including +1 or *2 or other mathematical expressions).

Thus, aggregate projections, such as top-k projections, may pre-aggregate the table data in useful ways before storing it such that query performance is benefited. Some databases may also provide a way to execute custom user-defined functions and transforms on data that is stored in the database. This may allow users to exploit the capabilities of an online analytics processing (OLAP) engine storing large quantities of data, while allowing them to process this data with their own implementations of statistical analyses, machine learning, etc, in various languages of their choice. However, user-defined functions and transforms may impractical to use for some applications.

Examples provide aggregated projections that can use these user-defined functions or transforms. In one example, a user-defined function (UDF) is received. Then, execution of the UDF is distributed into a plurality of phases. Lastly, each of the phases is executed separately on a relational database including an aggregate projection that stores an aggregate value calculated from a table column of a table using an aggregate function.

Thus, examples may allow users to stage the potentially expensive analysis of data in several batches, such as during data load, query time, and internal maintenance phases. This may lead to improved performance of queries. In addition, each of the stages to apply different transformations to the data.

Referring now to the drawings, FIG. 1 is an example block diagram of a system 100 to distribute execution of a user-defined function. The system 100 may include or be part of a microprocessor, a controller, a memory module or device, a notebook computer, a desktop computer, an all-in-one system, a server, a network device, a wireless device, a storage device, a node of a network and the like.

The system 100 is shown to include an interface unit 110, a distribution unit 120, an execution unit 130 and a relational database 140. The interface, distribution and execution units 110, 120 and 130 may include, for example, a hardware device including electronic circuitry for implementing the functionality described below, such as control logic and/or memory. In addition or as an alternative, the interface, distribution and execution units 110, 120 and 130 may be implemented as a series of instructions encoded on a machine-readable storage medium and executable by a processor.

The relational database 140 may be stored on a machine-readable storage medium, such as any electronic, magnetic, optical, or other type of physical storage device. For example, relational database 140 may be stored on Random Access Memory (RAM), an Electrically Erasable Programmable Read-Only Memory (EEPROM), a storage drive, a Compact Disc Read Only Memory (CD-ROM), and the like. Moreover, the relational database 140 may be distributed across a plurality of nodes of a network.

The interface unit 110 to parse a query 112 including a user-defined function (UDF) 114. The query 112 may take the form of any data query and may be expressed through the structured query language (SQL) or any other data access language. The UDF 113 may include two types of functions: a) scalar functions, and b) transform functions. A scalar function may return a single value as an output based on a set of input values. For example, a scalar function that computes the maximum value of three integers accepts three integers as input and produces a single integer as output.

A transform function may receive a set of values as input and maps the input set of values on to a new set of values (output set) or on to itself. The number of the members of the input set need not be the same as the number of the members of the output set. The number of input tuples and the number of output tuples does not necessarily have to be equal. Furthermore, the output tuples from a transform function need not have any columns or values in common with the input tuples.

The UDF 114 may provide a mechanism for extending functionality of a database server by adding a function that can be evaluated in a query. A UDF that can be used as a relational operator in a SQL query is one way to add analytics functions to SQL queries. UDFs can also be used as a data source function for retrieving data from external systems. The UDF 114 may include a base class definition (e.g., a Java class, C++, or any other suitable coding language) that encapsulates query engine interactions used by the UDF 114. Query engine interactions that may be encapsulated by the UDF 114 may include interactions for obtaining a host name, writing tuples, resolving a role, resolving a resource, and other suitable query engine interactions. Further, the UDF 114 may also specify various methods to be overridden by subclasses, such as a developer supplied function (e.g., an analytics function) that operates on one or more tuples stored in the database.

The distribution unit 120 may distribute execution of the UDF 114 into a plurality of phases. The execution unit 120 may separately execute each of the phases on the relational database 140 that includes an aggregate projection 142 that stores an aggregate value 144 calculated from a table column of a table 146.

The aggregate projection 140 may contain column values that have been aggregated from columns in the table 146. Querying data from aggregate projection may usually be faster than querying data from the table 146 and then aggregating it. Because the data is already aggregated, when aggregate projection 142 is queried, re-aggregation is not necessary. The same results are received as when the table 146 is queried. On subsequent loads, the relational database 140 updates both the table 146 and the aggregate projection 142. While only one aggregate projection 142 and one table 146 is shown, examples may include a plurality of aggregate projections 142 and or tables 146. Further, the aggregate projection 142 may include a plurality of aggregate values 144, expressions and/or functions.

Some types of aggregate projections 142, such as expression projections, the projection columns do not have to directly correspond to a single table. For other types of aggregate projections 142, such as non-expression projections, to keep track of which column in the projection represents which table column, there may two data structures/maps in the projection that map table columns to the indexes of the columns in the projection and vice versa. Each table column may presented by a pair of its table's object id (oid) and the position of the column in the table.

Further, as used herein, the term "expression" or similar language is meant to be understood broadly as any expression defined by the SQL standard such as, for example, the SQL-92 standard or any mathematical expression. In one example, the expression may produce either scalar values or tables consisting of columns and tuples of data.

The plurality of phases may include a data load phase 132, a query phase 134 and a maintenance phase 136. During the data load phase, the execution unit 130 may at least one break down and gather data. Further, during at least one of the query and maintenance phases 134 and 136, the execution unit 130 may to process the data. For example, during the data load phase, the UDTF could extract specific types of user interactions from a web server log stored in the column of a table. Then, during the query or maintenance phases 134 and 136, data analysis could be performed.

During the data load phase 132, the execution unit 130 may receive a command to load data into the table 146, such as INSERT (row by row) or COPY (bulk load a set of rows) command, and may load the data in to the aggregate projection 142. Assuming there are multiple loads, in one example, the data of the first and second load in the aggregate projection may not be aggregated together. One benefit of this strategy is that the system 100 may not have to read existing data while loading new data, but the side effect is the data stored in aggregated projection 142 is not completely aggregated. To make the partially aggregated data invisible to users, the data may be aggregated again the query phase 134, e.g. at a SELECT step.

By distributing the UDF across multiple phases, it can be decided where processing should occur: locally on each node (e.g. a "pre-pass" phase), or throughout a cluster of nodes. For example, the during the data load phase 132, data that is stored locally on the node can be processed where the instance of the UDF is running (rather than on data partitioned across all nodes). This may prevent large segments of data from being copied around the cluster and may be useful for an initial data processing phase where data does not need to be segmented in any particular way, such as breaking text documents into individual words. Depending on the type of processing being performed in later phases, it can be decided to have the data segmented and distributed across the cluster, such as during the query and maintenance phases 134 and 136.

The query phase 134 relates to accessing the aggregate projection 142 to retrieve the aggregate value 144 stored in the aggregate projection 142. During the query phase 134, the execution unit 130 may receive a query including a SELECT command which indicates the columns of the aggregate projection 142 to be read. Further, the execution unit 130 may aggregate the data within a partition of the aggregate projection 142 during the query phase 134.

Each time data is inserted into a table, the data is loaded into new files. After a while, there are many files which can slow down the reading process. The maintenance phase 136 relates to at least one of consolidating a read optimized store (ROS) container and purging a deleted record. The execution unit 130 at block 430 may aggregate the data from any partitions of the aggregate projection 142 during the maintenance phase 136 to determine an updated merged result with fully aggregated data.

For example, to avoid too many files in the system 100, the MERGE OUT operation may merge data from different files of a column to one file. The MERGE OUT operation may be part of larger operation that moves data from memory (WOS) to disk (ROS) to "flush" all historical data from the WOS to the ROS. A ROS (Read Optimized Store) container is a set of rows stored in a particular group of files. This larger operation may also combine small ROS containers into larger ones, and purge deleted data. During this larger operation, any storage policies are adhered to that are in effect for the storage location. Moreover, this larger operation may run in the background, performing some tasks automatically (ATM) at time intervals determined by its configuration parameters. These operations may occur at different intervals across all nodes and run independently on each node, ensuring that storage is managed appropriately even in the event of data skew.

Each of the phases 132, 134 and 134 may apply different transformations to the data. Executing the UDF 114 may further include executing a specialized operation that processes the tuple according to an analytics function. The specialized operation may generate a result, which may returned a source of the query. The system 100 is explained in greater detail below with respects to FIGS. 2-5.

Figure 2:
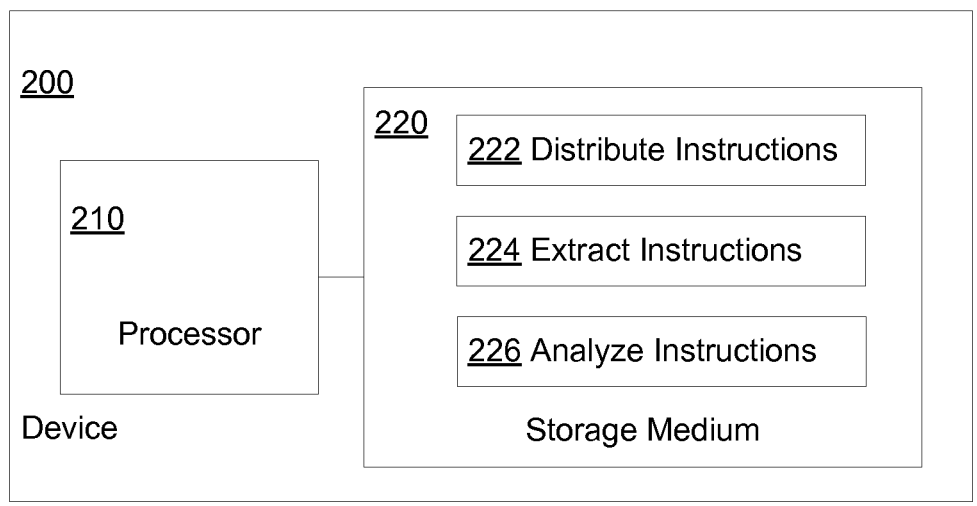
FIG. 2 is an example block diagram of a computing device including instructions for distributing execution of a user-defined function.

FIG. 2 is an example block diagram of a computing device 200 including instructions for distributing execution of a UDF. In the embodiment of FIG. 2, the computing device 200 includes a processor 210 and a machine-readable storage medium 220. The machine-readable storage medium 220 further includes instructions 222, 224 and 226 for distributing execution of the UDF.

The computing device 200 may be included in or part of, for example, a microprocessor, a controller, a memory module or device, a notebook computer, a desktop computer, an all-in-one system, a server, a network device, a wireless device, or any other type of device capable of executing the instructions 222, 224 and 226. In certain examples, the computing device 200 may include or be connected to additional components such as memories, controllers, etc.

The processor 210 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 220, or combinations thereof. The processor 210 may fetch, decode, and execute instructions 222, 224 and 226 to implement distributing execution of the UDF. As an alternative or in addition to retrieving and executing instructions, the processor 210 may include at least one integrated circuit (IC), other control logic, other electronic circuits, or combinations thereof that include a number of electronic components for performing the functionality of instructions 222, 224 and 226.

The machine-readable storage medium 220 may be any electronic, magnetic, optical, or other physical storage device that contains or stores executable instructions. Thus, the machine-readable storage medium 220 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 220 can be non-transitory. As described in detail below, machine-readable storage medium 220 may be encoded with a series of executable instructions for distributing execution of the UDF.

Figure 3:
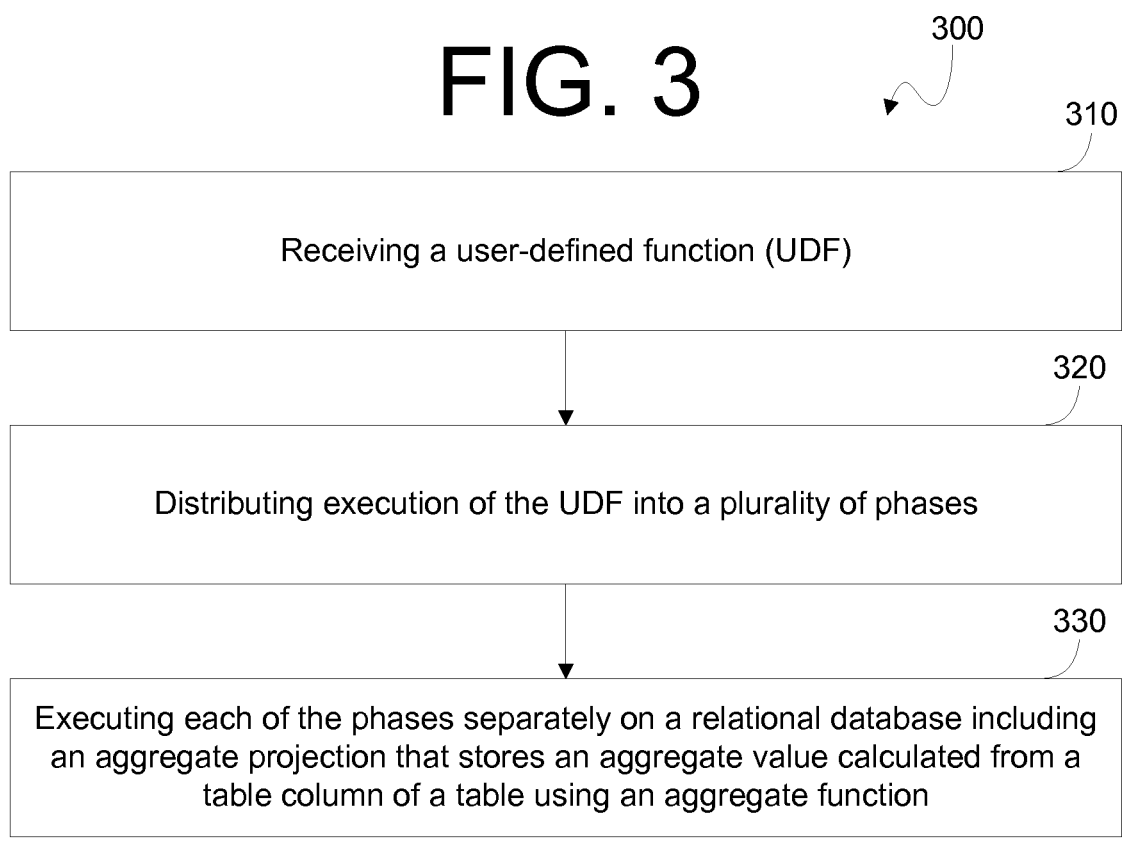
FIG. 3 is an example flowchart of a method for distributing execution of a user-defined function.
Figure 4:
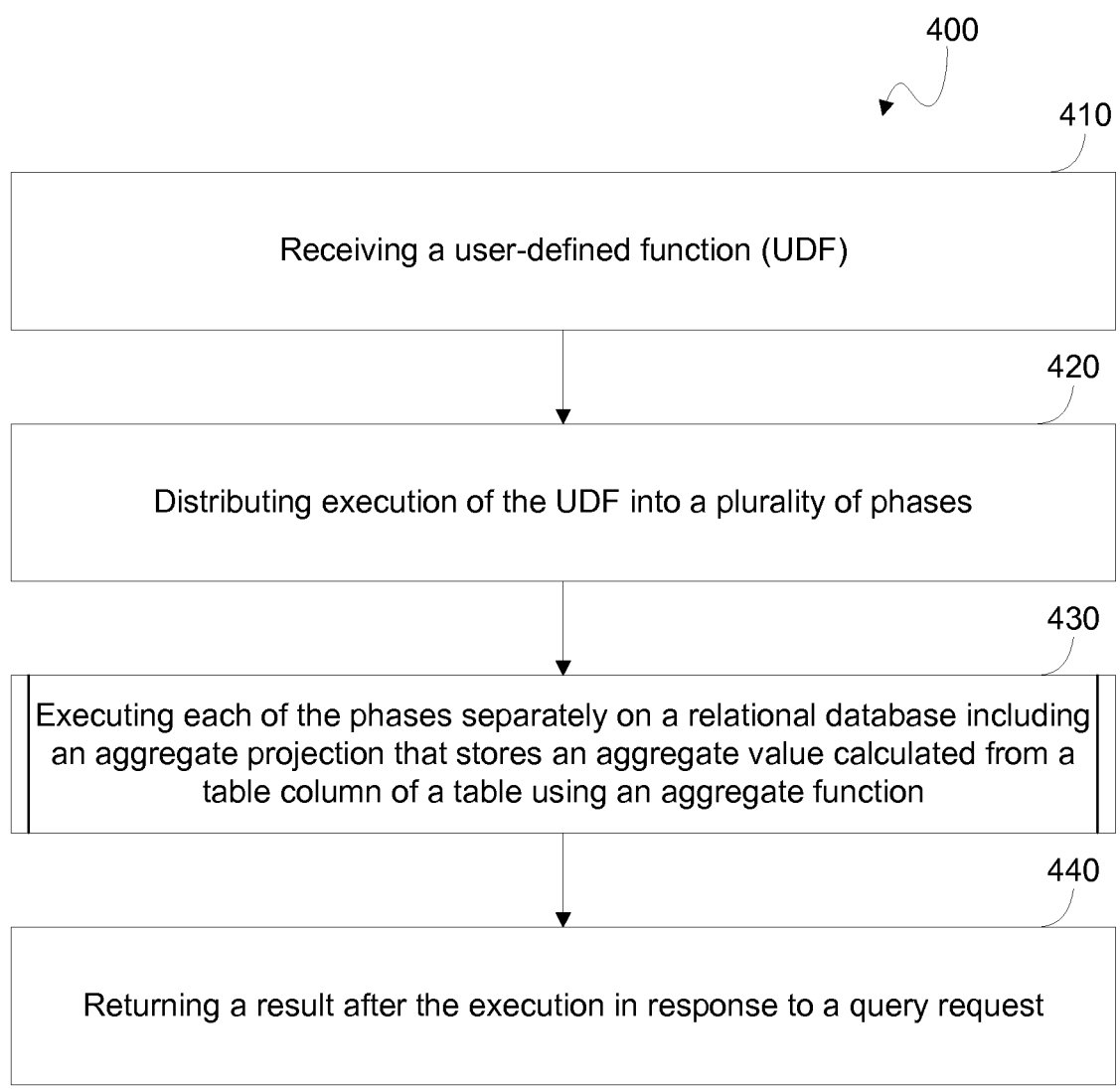
FIG. 4 is another example flowchart of a method for distributing execution of a user-defined function.
Figure 5:
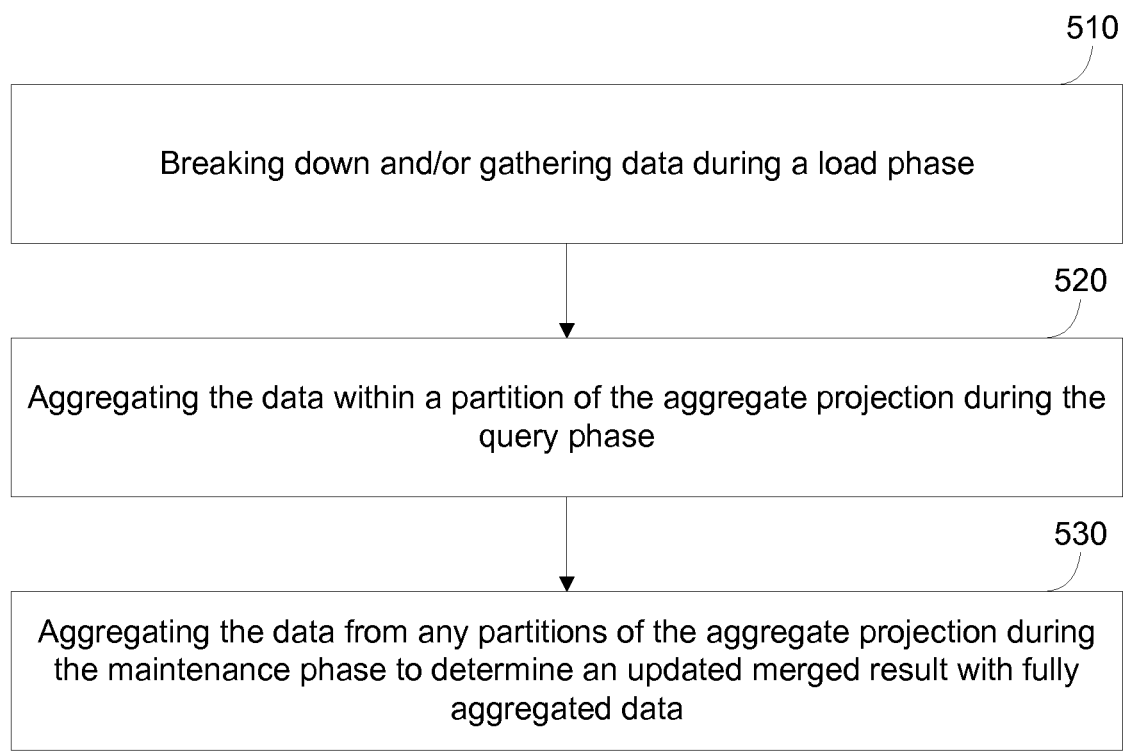
FIG. 5 is an example flowchart of the executing step of FIG. 4.

Moreover, the instructions 222, 224 and 226, when executed by a processor (e.g., via one processing element or multiple processing elements of the processor) can cause the processor to perform processes, such as, the processes of FIGS. 3-5. For example, the distribute instructions 222 may be executed by the processor 210 to distribute execution of a user-defined function among a plurality of phases.

The extract instructions 224 may be executed by the processor 210 to extract data at a local node of a plurality of nodes during a data load phase of the plurality of phases. The analyze instructions 226 may be executed by the processor 210 to analyze the data at a remote node of the plurality of nodes that includes a relational database including an aggregate projection that stores an aggregate value calculated from a table column of a table, during a query phase of the plurality of phases. The data may be loaded into a least one of a table and an aggregate projection corresponding to the table during the data load phase. The aggregate projection may be accessed to retrieve the aggregate value stored in the aggregate projection during the query phase.

FIG. 3 is an example flowchart of a method 300 for distributing execution of a UDF. Although execution of the method 300 is described below with reference to the system 100, other suitable components for execution of the method 300 can be utilized, such as the computing device 200. Additionally, the components for executing the method 300 may be spread among multiple devices (e.g., a processing device in communication with input and output devices). In certain scenarios, multiple devices acting in coordination can be considered a single device to perform the method 300. The method 300 may be implemented in the form of executable instructions stored on a machine-readable storage medium, such as storage medium 220, and/or in the form of electronic circuitry.

At block 310, the system 100 receives a UDF 114. Next, at block 320, the system 100 distributes execution of the UDF into a plurality of phases. Then, at block 330, the system 100 executes each of the phases separately on a relational database 140 including an aggregate projection 142 that stores an aggregate value 144 calculated from a table column of a table 146 using an aggregate function.

FIG. 4 is another example flowchart of a method 400 for distributing execution of a UDF. Although execution of the method 400 is described below with reference to the system 100, other suitable components for execution of the method 400 can be utilized, such as the computing device 200. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 220, and/or in the form of electronic circuitry.

At block 410, the system 100 receives a UDF 114. A query request 112 may be received from a local node at a remote node of a plurality of nodes of the system 100. The query request 112 may include the UDF 114. The receiving at block 410 may parse the query request 112 to identify at least one of an operator, an operation and the UDF 114. Next, at block 420, the system 100 distributes execution of the UDF into a plurality of phases. Then, at block 430, the system 100 executes each of the phases separately on a relational database 140 including an aggregate projection 142 that stores an aggregate value 144 calculated from a table column of a table 146 using an aggregate function.

At block 440, the system 100 returns a result after the execution at block 430, in response to a query request 112. The aggregate projection 142 may include a UDF that is tracked for a dependency. The dependency may relate to dropping a table column of at least one of a table and a projection. Each of the phases may receive a table as an input and to generate a table as an output. A schema for the output may be independent of a schema for the input for at least one of the phases.

FIG. 5 is an example flowchart of the executing step 430 of FIG. 4. The plurality of phases may include a data load phase 132, a query phase 134 and a maintenance phase 136. Each of the phases apply a different transformation to the data.

The data load phase 132 relates to loading data into a least one of a table 146 and an aggregate projection 142 corresponding to the table 146. At block 510, the system 100 may at least one of break down and gather data during the load phase 132. In one example, the system 100 may only process the data stored on a local node of a plurality of nodes of the system 100 during the data load phase 132. Further, the system 100 may not segment the data during the data load phase 132.

The query phase 134 relates to accessing the aggregate projection 142 to retrieve the aggregate value 144 stored in the aggregate projection 142. At block 520, the system 100 may aggregate the data within a partition of the aggregate projection 142 during the query phase 134.

The maintenance phase 136 relates to at least one of consolidating a read optimized store (ROS) container and purging a deleted record. At block 530, the system 100 may aggregate the data from any partitions of the aggregate projection 142 during the maintenance phase 136 to determine an updated merged result with fully aggregated data.

We claim:

1. A method, comprising:
receiving a query request including a user-defined function (UDF);
distributing, by a processor, execution of the UDF in the query request into a plurality of phases including a data load phase, a query phase, and a maintenance phase; and
executing, by the processor, each of the plurality of phases separately on a relational database including an aggregate projection that stores an aggregate value calculated from a table column of a table using an aggregate function, wherein each of the plurality of phases applies a different transformation to data in the relational database.

2. The method of claim 1, wherein the executing includes:
extracting data at a local node during the data load phase, and
analyzing the extracted data at a remote node that includes the relational database during the query phase.

3. The method of claim 1, wherein the data load phase relates to loading data into the aggregate projection corresponding to the table.

4. The method of claim 3, wherein the executing includes only processing the data stored on a local node of a plurality of nodes of a system during the data load phase, and not segmenting the data during the data load phase.

5. The method of claim 1, wherein
the query phase relates to accessing the aggregate projection to retrieve the aggregate value stored in the aggregate projection, and
the executing includes aggregating the data within a partition of the aggregate projection during the query phase.

6. The method of claim 5, further comprising:
parsing the query request to identify an operator, an operation and the UDF.

7. The method of claim 1, wherein
the maintenance phase relates to at least one of consolidating a read optimized store (ROS) container and purging a deleted record, and
the executing includes aggregating the data from any partitions of the aggregate projection during the maintenance phase to determine an updated merged result with fully aggregated data.

8. The method of claim 1, further comprising:
returning a result after the execution in response to the query request,
wherein the aggregate projection corresponding to the table is updated each time data is loaded to the table.

9. The method of claim 1, wherein
the UDF includes at least one of a transform function and a scalar function,
the scalar function returns a single value as an output based on a set of input values, and
the transform function receives an input set of values and maps the input set of values on to an output set of values.

10. The method of claim 1, wherein
the aggregate projection includes another UDF that is tracked for a dependency, and
the dependency relates to dropping the table column of the table.

11. The method of claim 1, wherein
each of the phases is to receive an input table and to generate an output table, and
a schema for the output table is independent of a schema for the input table for at least one of the phases.

12. A system, comprising:
an interface unit to parse a query to identify a user-defined function (UDF) in the query;

a distribution unit to distribute execution of the UDF in the query into a plurality of phases including a data load phase, a query phase, and a maintenance phase; and an execution unit to execute each of the plurality of phases separately on a relational database that includes an aggregate projection that stores an aggregate value calculated from a table column of a table, wherein each of the plurality of phases applies a different transformation to data in the relational database.

13. The system of claim 12, wherein the execution unit is to at least one of break down and gather data during the data load phase, and process the data during at least one of the query and maintenance phases.

14. The system of claim 12, wherein the execution unit is to:

extract data at a local node of a plurality of nodes during the data load phase; and analyze the extracted data at a remote node of the plurality of nodes that includes the relational database during the query phase.

15. The system of claim 12, wherein, during the maintenance phase, the execution unit is to:

consolidate a read optimized store (ROS) container or purge a deleted record; and aggregate data from any partitions of the aggregate projection to determine an updated merged result with fully aggregated data.

16. A non-transitory computer-readable storage medium storing instructions that, when executed by a processor of a device, cause the processor to:

parse a query to identify a user-defined function in the query;

distribute execution of the UDF in the query into a plurality of phases including a data load phase, a query phase, and a maintenance phase; and execute the query including the UDF in each of the plurality of phases separately on a relational database, wherein each of the plurality of phases applies a different transformation to data in the relational database.

17. The non-transitory computer-readable storage medium of claim 16, wherein the instructions are executable to cause the processor to:

load the data into a least one of the table and the aggregate projection corresponding to the table during the data load phase, and access the aggregate projection to retrieve the aggregate value stored in the aggregate projection during the query phase.

18. The non-transitory computer-readable storage medium of claim 16, wherein, to execute the query, the instructions are executable to cause the processor to:

extract data at a local node of a plurality of nodes during the data load phase; and analyze the data at a remote node of the plurality of nodes that includes the relational database during the query phase.

19. The non-transitory computer-readable storage medium of claim 18, wherein, during the data load phase, the instructions are executable to cause the processor to: only process the data stored in the local node without segmenting the data.

20. The non-transitory computer-readable storage medium of claim 16, wherein, during the maintenance phase, the instructions are executable to cause the processor to:

consolidate a read optimized store (ROS) container or purge a deleted record; and aggregate data from any partitions of the aggregate projection to determine an updated merged result with fully aggregated data.

* * * * *